Dec. 20, 1960        E. C. RANGUS        2,965,774
CASING STRUCTURE FOR PORTABLE TOOL
Filed July 17, 1957                              2 Sheets-Sheet 1
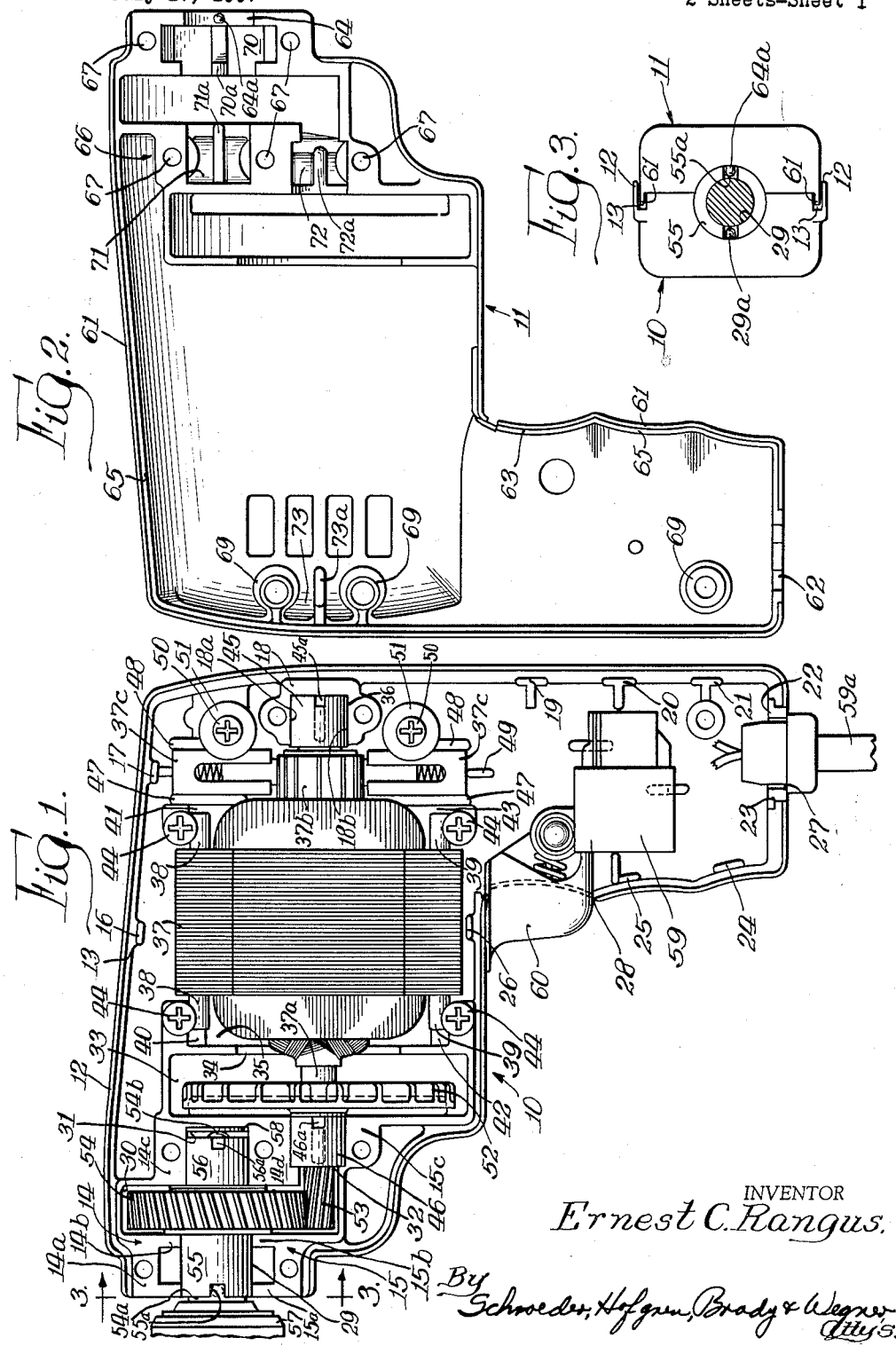
INVENTOR
*Ernest C. Rangus.*
By *Schroeder, Hofgren, Brady & Wegner*
                                *Attys.*

Dec. 20, 1960     E. C. RANGUS     2,965,774
CASING STRUCTURE FOR PORTABLE TOOL
Filed July 17, 1957     2 Sheets-Sheet 2
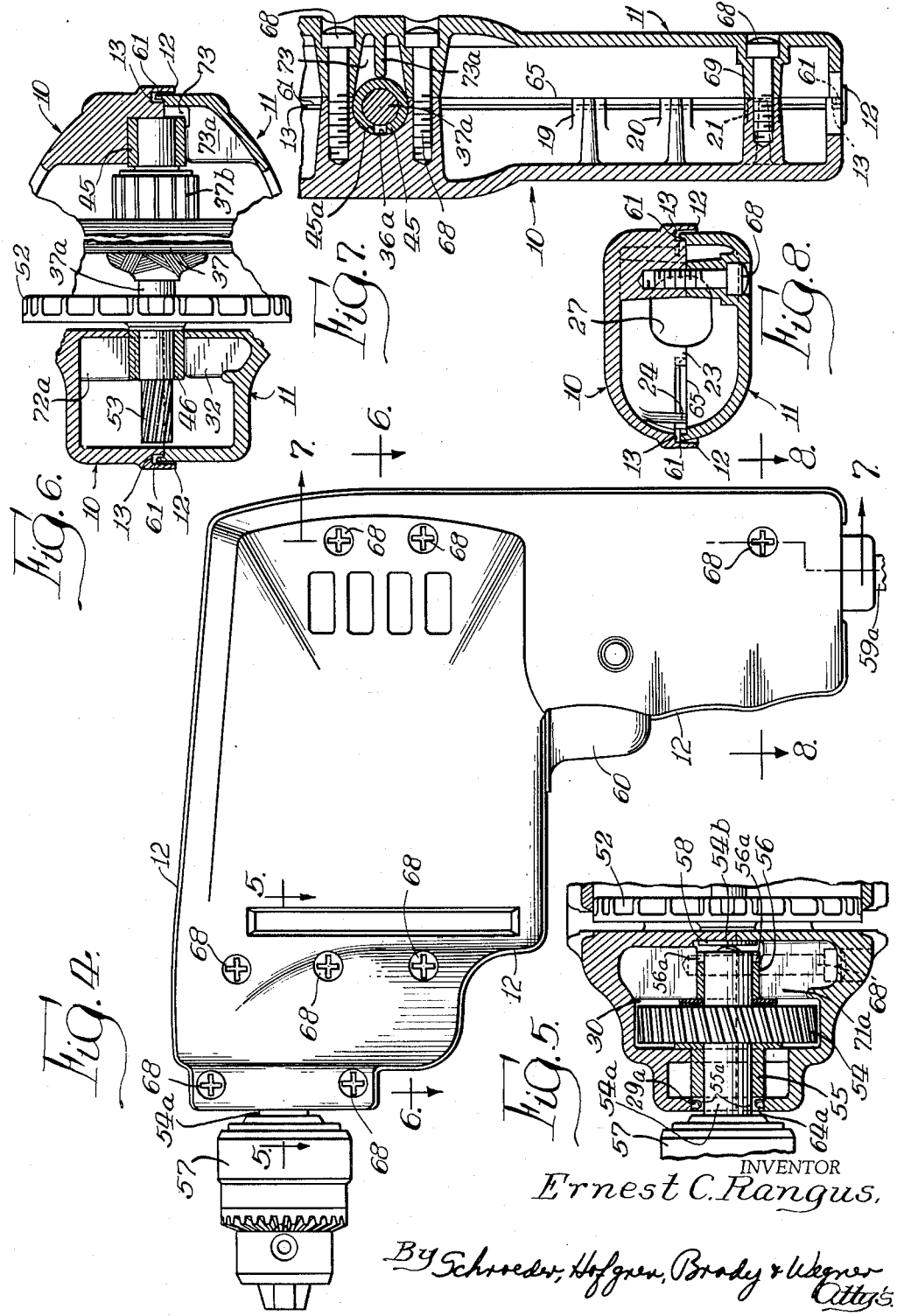
INVENTOR
*Ernest C. Rangus*
By *Schroeder, Hofgren, Brady & Wegner*
*Attys.*

United States Patent Office 2,965,774
Patented Dec. 20, 1960

2,965,774

CASING STRUCTURE FOR PORTABLE TOOL

Ernest C. Rangus, Lombard, Ill., assignor, by mesne assignments, to Thor Power Tool Company, Cicero, Ill., a corporation of Delaware Filed July 17, 1957, Ser. No. 672,494

4 Claims. (Cl. 310—50)

This invention relates to a portable power hand tool, and in particular it relates to an improved housing construction for such a tool.

Most portable power hand tools have their operating components carried in a die cast housing which is made in two matching halves, so that the operating components may be seated in suitable recesses in one-half of the housing, which provides a base member, and the other half of the housing affords a cover member. It is obvious that the inside width of the housing, from the inner surface of the base member straight across to the inner surface of the cover member, must be an accurately controlled dimension, and also that any recesses to receive bushings or bearings must be accurately dimensioned to hold the bearings firmly against movement in any direction. Insofar as applicant is aware, the usual practice in making portable tool housings has been to define the matching faces of the base member and the cover member by means of the parting line of the casting die, which makes it necessary to machine the matching surfaces in order to get the exact dimensions which are required for the interior of the housing. This is a major factor in the total cost of making such equipment.

The principal object of the present invention is to provide a housing for a portable power tool which is inexpensive to manufacture and which simplifies and speeds the assembly of the portable power tool.

A further object of the invention is to provide a housing for a portable power tool in which the operating components of the tool are all mounted and positioned in suitable recesses in a die cast base member, so that a die cast cover member may be fitted to the base member and secured with suitable fastening means.

Yet another object of the invention is to provide a housing for a portable tool in which the base casting and the cover casting are provided with abutting positioning surfaces the heights of which are determined by the construction of the casting dies so that said abutting surfaces need not be machined to proper height.

Yet another object of the invention is to provide a housing for a portable power tool in which a base member has a continuous peripheral rim which is formed by the parting line of the die, and which has cast bosses spaced inwardly from the rim which have their top surfaces below the rim, with a clearance groove between the rim and the bosses, together with a cover member which has a peripheral rim formed by the parting line of the casting die which is received in said clearance groove of the base member, the cover member having cast shoulder means which seats on the bosses in the base member.

Still another object of the invention is to provide a portable power tool housing in which a base member is provided with bearing recesses the depth of which is at least equal to half the diameter of the bearings to be mounted on them, and the side margins of which snugly embrace the bearing members to position the bearing accurately in one plane.

Yet another object of the invention is to provide a housing for a portable power tool in which the bearings are seated in recesses in a base member which position them accurately in one plane, and a cover member has a clearance for each bearing, with an upstanding cast rib in the clearance to abut the bearing and position it accurately in a plane perpendicular to the first plane.

The invention is illustrated in the accompanying drawings as applied to a portable drill construction; although it is obvious that the principles embodied in the housing structure are equally applicable to other power tools which are susceptible of mounting in cast housings.

In the drawings:

Fig. 1 is a side elevational view of a housing base member with the component parts of a power drill positioned therein;

Fig. 2 is an internal view of a housing cover member which matches the base member of Fig. 1;

Fig. 3 is a section taken as indicated along the line 3—3 of Fig. 1;

Fig. 4 is a side elevational view of an assembled power tool, showing the position of the cover member relative to the base member;

Fig. 5 is a fragmentary section taken as indicated along the line 5—5 of Fig. 4;

Fig. 6 is a fragmentary section taken as indicated along the line 6—6 of Fig. 4;

Fig. 7 is a fragmentary section taken as indicated along the line 7—7 of Fig. 4;

Fig. 8 is a section taken as indicated along the line 8—8 of Fig. 4.

Referring to the drawings in greater detail, and referring first to Figs. 1 and 2, the portable power tool housing of the present invention includes generally a die cast base member 10 and a matching die cast cover member 11. The base member has a substantially continuous peripheral rim 12 defined by the parting line of the die. As best seen in Figs. 1, 3 and 8, immediately inside the peripheral rim 12 is a continuous clearance groove 13; and immediately inside the clearance groove 13 is a discontinuous cast surface afforded by cast boss means which includes forward boss members indicated generally at 14 and 15, and a plurality of peripheral boss members 16, 17, 18, 19, 20, 21, 22, 23, 24, 25 and 26 spaced around the margin of the base member. As best seen in Figs. 1 and 8, the bosses 22 and 23 flank a power cord recess 27 in the margin of the base member, while the bosses 25 and 26 flank a trigger recess 28.

The surfaces of the boss members 14 and 15, and the bosses 16 to 26 inclusive, are all coplanar and below the rim 12 which is formed by the parting line of the casting die; and this permits the height of the boss members and the bosses to be accurately controlled by the dimensions of the casting dies. Thus, adequate and extremely accurately dimensioned space for the operating components of the power tool is provided without the need for any machining.

The forward boss members 14 and 15 have spaced forward portions numbered 14a, 14b, 15a and 15b, respectively, which define the side margins of an arcuate forward bearing recess, indicated generally at 29, the rear portion of which communicates directly with a deeper gear recess 30. To the rear of the gear recess 30 is another bearing recess 31, the sides of which are defined by intermediate portions 14c and 14d of the forward boss member 14. In spaced relationship to the boss portion 14d is a boss portion 15c, and said portions cooperate to define the margins of a forward motor bearing recess 32.

The rear of bearing recess 32 communicates with a fan recess 33 which is partially segregated by a wall 34 from a motor recess 35. The boss 18 at the rear of the base casting has side wall portions 18a and 18b each defining the sides of a rear motor bearing recess 36 which is directly in line with bearing recess 32.

The bearing recesses 29, 31, 32 and 36 in conjunction with the connecting recesses 30, 33 and 35, afford all the needed space for the various operating components of the drill. Thus, the operating components include a motor 37 which has a pair of arms 38 and 39 extending from the ends of its stator and resting on mounting blocks 40, 41, 42 and 43 which are positioned slightly below the level of the several boss members in order that headed screws 44 may be used to clamp the motor on the mounting blocks. The motor has a shaft 37a, the rear end of which is supported in a rear bearing 45 and the front of which is supported in a front bearing 46. Toward the rear of the motor shaft is the usual armature 3.b; and brush holders 37c are suitably disposed between pairs of positioning abutments 47 and 48, the boss 17 and an end abutment 49. A pair of screws 50 threaded into the abutments 48 have their heads overlying dielectric washers 51 beneath which the brush holders are clamped. On the front of the motor shaft 37a is a blower member 52.

At the forward end of the motor shaft, ahead of bearing 46, is a spiral pinion 53 which meshes with a spiral drill shaft gear 54 having a shaft 54a which is carried in bearings 55 and 56 mounted, respectively, in the bearing recesses 29 and 31. On the forward end of the drill shaft 54a is a Jacobs chuck 57. The rear of shaft 54a is provided with a ballbearing 54b which butts against a thrust disc 58 in the rear of bearing recess 31.

As best seen in Figs. 1, 3, 5 and 6, each of the bearings 45, 46, 55 and 56 is provided with aligned notches, numbered in the respective bearings 45a, 46a, 55a and 56a, which engage with suitable lugs in the bearing recesses to prevent turning of the bearings in their recesses. Thus bearing recess 36 is provided with a lug 36a, and there are lugs 32a, 31a, and 29a in the other respective bearing recesses.

Operation of the motor 37 is controlled by a suitable snap switch 59 actuated by a spring loaded trigger 60 which extends through the trigger recess 28 in conventional fashion. Electrical connection for the motor is through a power cord 59a which enters the housing through the cord opening 23.

The cover member 11 has a substantially continuous peripheral rim 61 which is broken by a cord opening 62, a trigger opening 63 and a front bearing clearance recess 64. In the front bearing clearance recess 64 is a lug 64a which may engage one of the marginal notches 55a of the front bearing 55.

Immediately inside and below the peripheral rim 61 is a narrow cast shoulder 65 which extends most of the way around the periphery of the cover member 11, and joins at the front with a shoulder structure indicated generally at 66, which provides surfaces mating with those of the forward boss members 14 and 15 of the base member 10. Cast into the cover member 11, and extending through the shoulder member 66 are holes 67 to receive fastening screws 68 by means of which the cover member 11 may be secured to the base member 10; while at the rear portion of the cover member are upstanding hollow screw receiving bosses 69 to receive additional fastening screws 68.

As best seen in Figs. 3, 6, 7 and 8, when the cover member 11 is mounted upon the base member 10 the peripheral rim 61 of the cover member is received in the marginal grooves 13 of the base member, and the cast surfaces of the peripheral shoulder 65 and the forward shoulder structure 66 of the cover member seat upon the forward boss members 14 and 15 and upon the individual, spaced boss members 16 to 26, inclusive, of the base member 10. Since the boss members and the shoulder members are cast parts, their height is accurately fixed by die dimensions so that there need be no machining of the matching surfaces to assure correct dimensions of the various bearing component recesses when the base member and cover members are assembled.

Referring now particularly to Figs. 2, 5, 6 and 7, it will be observed that the cover member 11 has a forward drill shaft bearing clearance 70, a rear drill shaft bearing clearance 71, a forward member shaft being clearance 72 and a rear motor shaft bearing clearance 73. Since the position of the bearings in one plane (parallel to the planes of the tops of the bosses in the base member and the shoulders of the cover member) is fixed by the structure of the bearing recesses in the base member 10, the bearing clearances in the cover member 11 may be quite large and require no close tolerance. However, to avoid the possibility that the bearings will shift laterally in the housing due to the looseness between any bearing and its respective clearance in the cover member, each clearance is provided with an upstanding rib, indicated in the respective clearances as 70a, 71a, 72a and 73a. These ribs are also cast into the cover member so that the height of each is accurately controlled by the cover die member, and accordingly the tops of the ribs may bear directly upon the bearing members with which the various clearances are associated. Thus, the bearing rib 70a bears upon bearing 55, bearing rib 71a upon bearing 56, rib 72a upon bearing 46, and rib 73a upon bearing 45. Contact of said ribs with the bearings positions the bearings laterally of the tool, considering the tool in its assembled condition; and this positioning is thus in a plane perpendicular to the positioning of the bearing members which is caused by the engagement with the bearings of the sides of the bearing recesses in the base member.

From the foregoing detailed description it is apparent that the present invention provides a housing structure for a portable power hand tool which may be completed substantially without machining. In fact, the only machining required is the drilling and tapping of suitable screwholes in the base member 10 to receive the attachment screws 68 by means of which the cover member 11 is secured to the base member 10 and also to receive the motor mounting screws 44 and the brush mounting screws 50.

The foregoing detailed description is given for clearness of understanding only and no unnecessary limitations should be understood therefrom, as modifications will be obvious to those skilled in the art.

I claim:

1. In a portable power tool, a housing comprising: a die cast, generally concave base member having recesses to receive and position the operating components of the tool, said base member having a peripheral rim formed by the parting line of the die; cast boss means spaced inwardly from said rim, the upper surface of said boss means being below the plane of the rim and providing a cast abutting face, there being a continuous clearance groove between the rim and the boss means; a die cast, generally concave cover member the margin of which is formed by the parting line of the die and nests within said rim extending into said clearance groove out of contact with the wall of the groove; peripheral shoulder means cast integrally with the cover member below the plane of said margin, said shoulder means providing cast abutting faces seated on the abutting faces provided by the boss means in the base member; and fastening means detachably securing the cover member on the base member with said abutting faces on the base member and the cover member in contact and the margin of the cover member projecting into the clearance groove but not seated therein.

2. In a portable power tool, a housing comprising: a die cast, generally concave base member having a plurality of cast bearing recesses communicating with component recesses, each bearing recess being of a depth no less than half the diameter of the bearing in it and having side margins which engage and position the bearing in a first plane, said base member having a peripheral rim;

cast boss means spaced inwardly from said rim to provide a cast abutting seat for a cover member; a die cast, generally concave cover member having cast peripheral shoulder means seated on the boss means in the base member, said cover member having bearing clearances around the bearings in the base member; cast bearing ribs in said bearing clearances which abut said bearings to position them in a plane perpendicular to said first plane; and fastening means detachably securing the cover member on the base member with said shoulder means seated on said boss means and said ribs clamping said bearings firmly in the bearing recesses.

3. In a portable power tool, a housing comprising: a die cast, generally concave base member having a plurality of cast bearing recesses communicating with component recesses, each bearing recess being of a depth no less than half the diameter of the bearing in it and having side margins which engage and position the bearing in one plane, said base member having a peripheral rim which is formed by the parting line of the die; cast boss means spaced inwardly from said rim, the upper surface of said boss means being below the plane of the rim and providing a cast abutting face, there being a continuous clearance groove between the rim and the bosses; a die cast, generally concave cover member the margin of which is formed by the parting line of the die and nests within said rim extending into said clearance groove and out of contact with the wall of the groove, said cover member having bearing clearances around the bearings in the base member; integrally cast peripheral shoulder means in the cover member below the plane of the margin of said member, said shoulder means providing cast abutting faces seated on the abutting faces provided by the boss means in the base member; cast bearing ribs in said bearing clearances which abut said bearings to position them in another plane; and fastening means detachably securing the cover member on the base member with said abutting faces on the base member and the cover member in contact and the margin of the cover member projecting into the clearance groove but not seated therein.

4. In a portable power tool, a housing comprising: a die cast, generally concave base member having interconnected recesses to receive and position the operating components of the tool, said base member having a peripheral rim formed by the parting line of the die; a plurality of cast boss members spaced inwardly from said rim, said boss members having coplanar upper surfaces which are below the plane of the rim and provide cast abutting faces, and there being a continuous clearance groove between the rim and said boss members; a die cast, generally concave cover member, the margin of which nests within said rim and extends into said clearance groove out of contact with the wall of the groove; shoulder means cast integrally with the cover member below the plane of the margin of said member, said shoulder means having coplanar cast abutting surfaces seated on the abutting faces provided by the bosses in the base member; and fastening means detachably securing the cover member on the base member with said abutting faces on the base member and the cover member in contact and the margin of the cover member projecting into the clearance groove but not seated therein.

References Cited in the file of this patent

UNITED STATES PATENTS

| 1,540,038 | Spielman | June 2, 1925 |
| 2,319,194 | Youhouse | May 11, 1943 |
| 2,477,150 | Snyder et al. | July 26, 1949 |
| 2,582,229 | Brown et al. | Jan. 15, 1952 |
| 2,763,802 | Dolan | Sept. 18, 1956 |

FOREIGN PATENTS

| 825,304 | France | Dec. 8, 1937 |